UNITED STATES PATENT OFFICE 2,483,883

CATALYTIC PRODUCTION OF KETENE FROM ACETIC ACID

Paul Camille Elie Jacques Corbiere, Lyon, France, assignor to Societe "Rhodiaceta," Paris, France, a French body corporate No Drawing. Application July 14, 1947, Serial No. 760,933. In France July 16, 1946

6 Claims. (Cl. 260—585.5)

This invention is for improvements in or relating to the production of ketene and derivatives thereof.

It is known to prepare ketene by the vapour phase pyrolysis of acetic acid and to obtain derivatives of ketene by passing the pyrolysis product into a suitable liquid (such as an alcohol or acetic acid), the nature of which depends, of course, upon the derivative to be obtained. The yield is, however, poor, owing to the formation of solid or gaseous decomposition products and it is known that an improvement in yield can be effected by carrying out the reaction in the presence of a catalyst, chiefly phosphoric acid or derivative thereof in quantity ranging from 0.2% to 0.4% by weight of the quantity of acetic acid introduced into the reactor which normally consists of one or more tubular elements. Despite the advantage of providing increase in yield, these catalysts as currently used are disadvantageous in that they and/or the products formed therefrom during the pyrolysis for the greater part collect in molten form in the reactor and in that way cause undesirable obstruction therein, with the result that the apparatus must be periodically dismantled and the affected parts carefully cleaned.

In accordance with the present invention, it has now been found that by admixing with the said catalysts a member of the class consisting of nitric acid, nitrous acid and organic derivatives of these acids including not only their esters, but also compounds containing at least one oxygenated nitrogen atom directly linked to a carbon atom, fouling of the reactor is considerably reduced or is eliminated. Furthermore, as a result of use of such admixture the yield of ketene is substantially increased.

The present invention, therefore, consists in a process for the production of ketene by the vapour phase pyrolysis of acetic acid in the presence of a catalyst consisting of phosphoric acid or derivative thereof, which is characterised in that the catalyst is admixed with a member of the class consisting of nitric acid, nitrous acid and organic derivatives of these acids including compounds containing at least one oxygenated nitrogen atom directly linked to a carbon atom.

In carrying the present invention into effect, the quantity of phosphoric acid or derivative thereof employed is generally less than the amount heretofore used for the stated purpose, the balance being made up by the member of the stated class. Thus, in general, it is preferred to use a total quantity of phosphoric acid or derivative thereof and of said member which lies between about 0.2% and 0.4% of the weight of acetic acid treated. Examples of the aforesaid class in addition to nitric acid and nitrous acid, include the organic esters thereof such as ethyl nitrate and butyl nitrate and nitro- and nitroso derivatives. The nitro and nitroso derivatives, which are especially useful, are compounds in which at least one oxygenated nitrogen atom is directly linked to a carbon atom and may be selected either from the aliphatic or from the cyclic series including heterocyclic compounds, the nucleus of which contains at least one atom of oxygen, of nitrogen, or of sulphur. Thus, for example, excellents results are obtained with nitro-ethane, nitroso-benzene, nitroso-beta-naphthol, nitrofurane and like substances. It is also possible to use nitro- or nitroso-derivatives of the oxygenated derivatives of hydrocarbons, such for example as nitro-acetic acid or the like.

The process of the present invention is illustrated by the following examples.

Example I

Acetic acid vapour is forced into a V4A steel tube about 1.5 cm. in diameter at a temperature of 820° C. under a pressure of 360 mm. of mercury and at a rate of about 3 g. per minute. The ketene is converted into acetic anhydride by passing it into glacial acetic acid in the cold state in accordance with the known reaction.

The following table shows the percentage of acetic acid converted into ketene in the reaction tube:

| Test No. | Catalyst employed | Percentage by weight converted |
|---|---|---|
| 1 | None | 1.3 |
| 2 | 0.3% of triethyl phosphate | 9.8 |
| 3 | 0.2% of triethyl phosphate+0.1% of ethyl nitrate | 10.3 |

The increase in yield in Test No. 3 was, therefore, greater than 5%. It was also observed that the reaction tube was not fouled after prolonged working.

Example II

Acetic acid vapour is passed into a V4A steel tube about 1.5 cm. in diameter at a temperature of 820° C. under a pressure of 360 mm. of mercury and at the rate of about 3 g. per minute. The ketene obtained is converted into acetic anhydride by passing it into acetic acid.

The following table shows the percentage of acetic acid converted into ketene in the reaction tube:

| Test No. | Catalyst employed | Percentage converted |
|---|---|---|
| 1 | None | 0.8 |
| 2 | 0.3% of triethyl phosphate | 8.8 |
| 3 | 0.2% of triethyl phosphate+0.1% of butyl nitrate | 9.5 |

The increase in yield in Test No. 3 amounts almost to 10%, while there is no fouling of the reaction tube.

*Example III*

Into a V4A steel tube 20 mm. in diameter acetic acid vapour is passed at a temperature of 910° C. under a pressure of 360 mm. of mercury and at the rate of 3 g. per minute.

The ketene obtained is converted into acetic anhydride by passing it into acetic acid.

Using for purposes of comparison the conversion yield obtained when no catalyst is employed and expressing this yield as 10, the conversion yields obtained with different catalysts are the following:

| Test No. | Catalyst employed | Conversion Yield |
|---|---|---|
| Comparison | None | 10 |
| 1 | 0.05% triethyl phosphate | 20 |
| 2 | 0.25% triethyl phosphate | 35 |
| 3 | 0.05% triethyl phosphate+0.2% of nitromethane | 40 |
| 4 | 0.05% triethyl phosphate+0.2% 1-3-dinitrobenzene | 36 |

As will be seen from the results of Tests 3 and 4, improved yields are obtained by replacing a substantial proportion of the triethyl phosphate by catalysts according to the present invention.

I claim:

1. Process for the production of ketene which consists in the vapor phase pyrolysis of acetic acid in the presence of a catalyst consisting of a lower ester of phosphoric acid in association with a member of the group consisting of a lower ester of nitric acid and a nitro-hydrocarbon.

2. Process for the production of ketene which consists in the vapor phase pyrolysis of acetic acid in the presence of a catalyst consisting of a lower ester of phosphoric acid in association with a lower ester of nitric acid.

3. Process for the production of ketene which consists in the vapor phase pyrolysis of acetic acid in the presence of a catalyst consisting of a lower ester of phosphoric acid in association with a nitro-hydrocarbon.

4. Process, as claimed in claim 1, wherein the total weight of the catalyst and associated compound lies between 0.2% and 0.4% by weight of the acetic acid treated.

5. A process for the production of ketene which comprises passing in a heated reactor tube at a temperature of 820° to 910° C. a mixture of acetic acid vapor, a lower ester of phosphoric acid and a lower ester of nitric acid.

6. A process for the production of ketene which comprises passing in a reactor tube at a temperature of 820° to 910° C. a mixture of acetic acid vapor, a lower ester of phosphoric acid and nitro-hydrocarbon.

PAUL CAMILLE ELIE
JACQUES CORBIERE.

REFERENCES CITED

The following references are of record in the file of this patent:

UNITED STATES PATENTS

| Number | Name | Date |
|---|---|---|
| 2,143,489 | McAllister et al. | Jan. 10, 1939 |
| 2,160,841 | Dreyfus | June 6, 1939 |
| 2,175,811 | Loder | Oct. 10, 1939 |
| 2,202,046 | Dreyfus et al. | May 28, 1940 |